United States Patent Office 3,037,423
Patented June 5, 1962

3,037,423
AUTOMATIC FOCUSING SYSTEM
William A. Shurcliff, Cambridge, Mass., assignor to Polaroid Corporation, Cambridge, Mass., a corporation of Delaware
Filed Dec. 30, 1957, Ser. No. 705,852
3 Claims. (Cl. 88—26)

This invention relates to systems which automatically appraise and maintain a predetermined focus of optical devices with which they are associated, and more particularly, to such systems when incorporated into image-projection means.

To obtain a desired image projection of an object or specimen by optical projection means usually involves manual adjustment of the focus of the system. Where the projection means is, for example, a slide projector of the type well known to the art, variations due to manufacturing tolerances in the slide holder, bulging of the slide either from the heat of the projection lamp or from distortions occurring in the photographic processing of the slide, variations in thickness or warping of the slide frame, will all change the focus from an initial adjustment and destroy its sharpness. This necessitates frequent readjustment of the focus, often from slide to slide. Similar difficulties are present in the maintenance of correct focus in other projection devices such as motion picture projectors. The problem of maintaining proper focus becomes particularly pressing under circumstances where the proper focus is highly critical, as for instance, in the projection of three-dimensional motion pictures and in slide projectors provided with automatic slide loading devices.

It is readily apparent that an automatic system for maintaining a preset focus is highly desirable and, in some instances, a necessity. Attempts have been made to provide devices which will perform this function automatically, each device having limitations inherent in the approach to the problem. Most prior automatic focusing systems have been based on an appraisal of focus in terms of the information content in a component of the image at the plane of the principal external focus of the projector, or at a plane of a subsidiary external focus. The terms of the information content sought usually consisted of high frequency components, relative light intensity, congruent registration with a test image, or others. These systems have suffered in common primarily from either a lack of continuity in appraisal or from the limitation imposed in the appraisal of the information content where the image is subject to contraction or expansion with changes in focus. Accordingly, it is an object of this invention to include, in an optical system comprising focusing means and an object containing means, automatic means for continuous appraisal and maintenance of the focus of said optical system.

Another object of this invention is to provide, in an image-projecting device, a system for maintaining a focus of said device by means so constructed that radiation reflected from an object in an object containing means in said device is continuously appraised to determine the position of said object and said focus is adjusted by means responsive to said appraisal means.

Still another object of this invention is to provide a system wherein a preset focus of an image-projecting device is maintained by means for continuously appraising the position of the center of the plane of a plane-surfaced object by reflecting light therefrom in combination with automatic means for adjusting the relative distance of said center and the objective lens of said projection device with respect to each other, said automatic adjusting means being responsive to said appraisal means.

Another object of this invention is to provide a process of appraising and maintaining the location of an object-bearing sheet relative to an objective lens in an image-projecting device.

Still another object of this invention is to provide, in combination, an image-projecting means comprising a light source, an object containing means for supporting an object and means for focusing an image of said object externally to said image-projecting means, together with means for continuously appraising the axial position of said object with respect to said focusing means by reflecting light from said object and measuring lateral displacements of said light which are proportionate to axial displacements of said object, electronic means responsive to said appraisal means, and drive means responsive to said electronic means for adjusting the relative positions to each other of said object containing means and said focusing means, said appraisal means being adapted to continuous operation over long periods of time.

Other objects of this invention will in part be obvious and will in part appear hereinafter.

The invention accordingly comprises the process involving the several steps and the relation and order of one or more of such steps with respect to each of the others, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following description taken in connection with the accompanying drawings wherein.

Figures 1, 2:
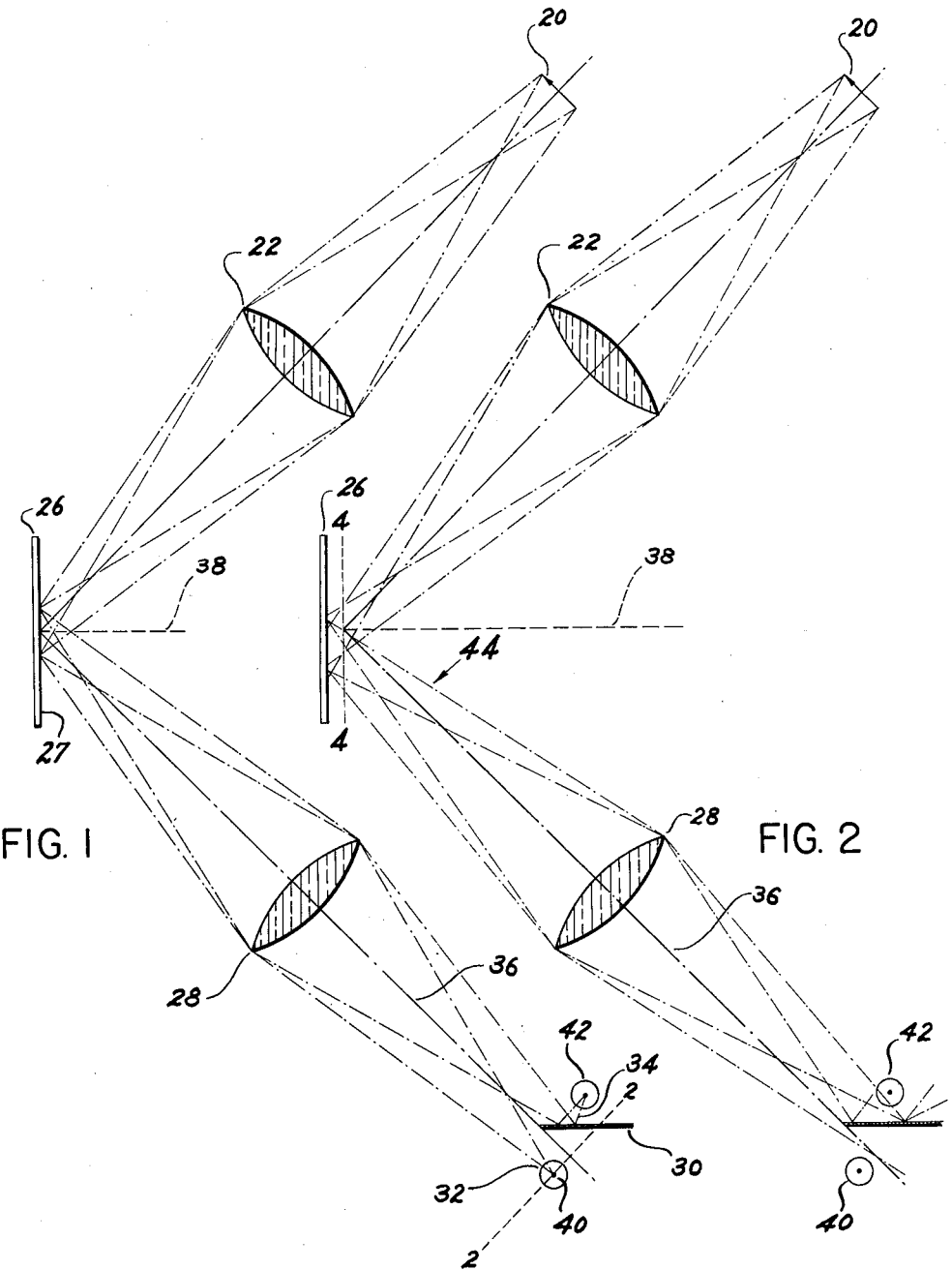
FIGURE 1 is a diagrammatic view of an appraisal subsystem, showing said system at balance.
FIG. 2 is a diagrammatic view of said appraisal subsystem showing the system at imbalance.

Generally, the present invention comprises a combination of three subsystems: an image-projection system, an appraisal system and a focus adjustment system.

An image-projection system may be any one of several systems well known to the art such as a motion picture projector, a slide projector, a so-called "magic lantern" or a stereopticon. These systems all have common basic elements. A typical system may comprise a light source, a focusing means comprising an objective lens or lenses, and an object holding means such as a slide holder disposed in a focusing relation to the objective lens such that an image of an object supported in said object holding means may be projected upon an external focal plane such as a screen. In a properly focused projector the object holding means will be disposed such that the object is located at an internal focal plane of the objective lens. In all of these systems the sharpness of the focus of the image projected onto the screen is, in a sense, a function of the positional coordinates of three elements: the object or internal focal plane, the objective lens and the external focal plane or screen, relative to one another in a given frame of reference.

A proper focus of these three elements may be obtained by holding any two of the three constant while varying the third. The usual manner is to vary the position of the objective lens which is generally axially movable in its mounting in the projection system. However, a desired sharpness of focus may be obtained equally as well by varying the location of either the screen or the object along the optic axis of the objective lens. This invention, in correcting for small axial displacements of the object in and out of coincidence with the internal focal plane, will function equally as well utilizing either the object or the objective lens as the variable to be corrected.

The function of the appraisal system is basically to appraise the location of the object with respect to its displacement from the location of the objective lens along the optic axis of said lens. Once the focus of the projection device has been preset by establishing coincidence between the object and internal focal plane and by establishing a related coincidence between the corresponding external focal plane and the screen, any movement of the object out of the internal focal plane by displacement along the objective lens optic axis will destroy the sharpness of the image. The appraisal system provides a means for performing a process whereby such change in focus will be detected by optical means for measuring such axial displacement of the object. This is accomplished by producing and directing a beam of light to a point at which the optic axis of said objective lens perpendicularly intersects the internal focal plane of said lens. It is preferred that the beam of light be directed at said point because the interest of a spectator is generally directed at or near the center of the screen, and because changes in focus which are most pronounced are usually attributable to changes in the position of the center of the object. However, the invention will also operate when the beam of light is directed at other points on the internal focal plane. In the preferred embodiment the beam of light is channeled to this point by means for focusing said beam such as a double convex lens. However, any collimating means for producing a beam of substantially parallel rays may be used in place of a focusing means.

When the projector is properly focused, the beam of light is reflected from the object located at said point and is in turn directed upon a light-sensitive means disposed in the mean optical path of the reflected beam. There may be disposed between said object and said light-sensitive means a focusing means to converge said reflected beam to a focal plane coincident with said light-sensitive means. And there also may be disposed in the mean optical path of the reflected beam, between said focusing means and said light-sensitive means, a position discriminating beam splitting means to divide the reflected beam into a plurality of beams. Said beam splitting means distributes said subsidiary beams to said light-sensitive means. At a proper focus of the projection system, the light-sensitive means may receive a predetermined ratio of light intensities from said subsidiary beams. However, any change in focus due to axial displacements of the object along the objective lens optic axis will cause a lateral displacement of the reflected beam of light and a consequent change in said ratio of light intensities. This change in ratio causes an imbalance in the electrical output of said light-sensitive means. Although both a focusing means to converge the reflected beam and a beam splitting means are desirable, neither means is necessary to the operation of the invention. As is well understood in the art, the optical path of the beam of light in the appraisal subsystem from the light-producing means to the light-sensitive means may be folded to provide any one of a variety of paths through the use of prisms or mirror systems without departing from the spirit of the invention. A distinct advantage of this type of appraisal system lies in the successful operation by physical appraisal of the object without interposing matter of any kind into the optical path of the main projection device. Further, the system operates correctly regardless of the optical density of the object because the information content appraised is positional and does not depend, for instance, on silver grain distribution in a diapositive.

The focus adjustment system for correcting any axial displacements of the object comprises electronic means responsive to signals received from the appraisal system, which signals constitute the output of the light-sensitive means of the appraisal system. The focus adjustment system amplifies the signal received from the appraisal system and translates said signal into a substantial working voltage proportional in magnitude and direction to said signal. The working voltage is then directed to a motor system for moving either the object holding means or the objective lens to displace one or the other equally and oppositely to the axial displacement which has caused the variation in focus. Alternatively, said working voltage may be introduced into a meter to indicate the magnitude and direction of the needed correction, said correction then being set manually in response to said meter reading. Other systems for translating electrical signals into proportionate mechanical motions to displace an element may be used. The entire appraisal and maintenance system has a basic advantage as to the ultimate precision of focus which may be achieved compared to the precision obtainable by a human operator. The greater the depth of field of the projecting apparatus, the less is the ability of an operator to detect slight changes in focus. Whereas the operator judges an image on a screen produced by a projection lens having a greater depth of field than this system provides (the projection lens subtends an angle of approximately ten degrees relative to the object whereas the appraisal system may actually be arranged to subtend seventy degrees relative to the object), the system has a far greater ability to detect slight changes in the plane of the object.

Referring to the drawings, wherein like numerals denote like parts, there is shown in FIG. 1 a schematic view of the optics of an appraisal subsystem. A radiation source 20 is shown from which the rays of radiation are directed toward a first focusing means, such as first lens 22, for focusing an image 24 of radiation source 20 upon the intersection of axis 38 and focal plane 4—4, an object, such as object 26 having a planar surface 27, being located at plane 4—4. The width of light source 20 and the width of focused image 24 thereof are exaggerated for the purposes of clarity, the preferred embodiment comprising a line-like image of very short length and extremely narrow width relative to the size of object 26. In accordance with well known laws of optics, the rays of radiation producing image 24 are reflected from object 26 at angles equal to the respective angles of incidence. The reflected rays of light are directed through second focusing means, comprising second lens 28 for focusing said rays upon a focal plane 2—2. Disposed between second lens 28 and plane 2—2 is a beam splitting means 30 for dividing said reflected beam into subsidiary beams 32 and 34. It is understood that beam splitting means 30 may also be disposed coincident with plane 2—2. Said beam splitting means comprises a surface having a longitudinal edge disposed tangent to optic axis 36 of second lens 28 and having its plane disposed at an oblique angle to axis 36. Insofar as image 24 has finite size, its longitudinal axis is disposed to be parallel with said longitudinal edge of beam splitting means 30. Located at the focal points of subsidiary beams 32 and 34 are light-sensitive means 40 and 42, respectively, both shown as photoelectric cells.

In FIG. 2 is shown the same system with, however, the plane of object 26 displaced along axis 38 from its original location at focal plane 4—4. It will be noted that the radiant beam 44 comprising a reflection of the image of light source 20 has now been displaced laterally with respect to the optic axis 36 of second focusing means 28, and that light-sensitive means 42 is now exposed to a disproportionate amount of light from said reflected beam. The magnitude of this lateral displacement may be expressed as a function of the magnitude of the axial displacement of object 26 along axis 38. Hence, any ratio of light intensities received by photocell 42 and photocell 40, as in FIG. 1, has now been altered in accordance with and proportionately to the lateral displacement of said reflected beam responsive to axial displacement of object 26 from focal plane 4—4.

Figure 4:
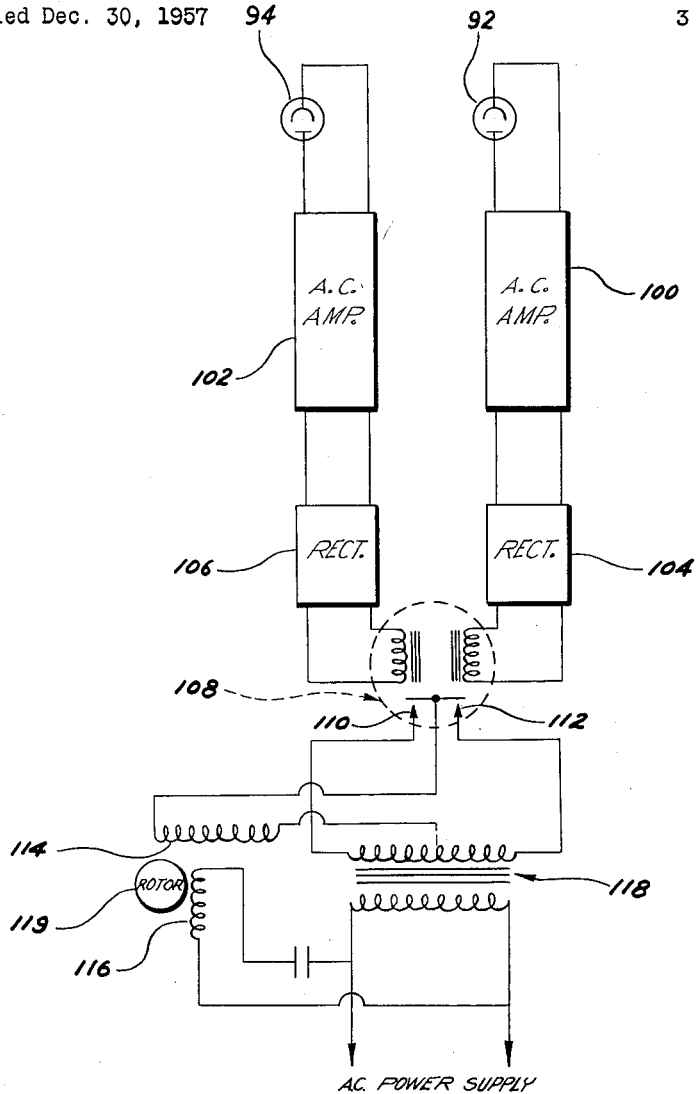
FIG. 4 is a block diagram showing one suggested electronic relation between said appraisal system and a focus adjustment system.

The associated elements of an automatic focus control system comprehended by the present invention are represented in FIG. 4 as they would appear from a side of the projector.

As a means for enclosing and mounting the operative elements of the focus appraisal subsystem there is provided a typical image projection subsystem such as projector 50 having a housing frame 52. Enclosed in frame 52 are a projector light source such as an incandescent filament bulb 54 and an associated reflecting means 56. Other light sources, as for instance, arc light or gaseous discharge tubes, may be employed. Disposed to that side of bulb 54 opposite reflecting means 56 is light condensing means comprising lens 58; said light condensing means may also comprise a group of lenses for collimating the rays of light from bulb 54. An object, as for instance a film slide 60, is mounted in an object containing means such as slide holder 62 and is disposed to that side of condensing lens 58 opposite bulb 54, the surface 63 of object 60 being perpendicular to and on the optic axis of condensing lens 58. A focusing means, comprising objective lens 66 mounted for axial movement in lens mounting means 68, is disposed with its optic axis 38 colinear with the optic axis of condensing lens 58 at a predetermined position on that side of film slide 60 opposite condensing lens 58. Slide holder 62 is pivotally mounted inside housing frame 52 at pivot 64 for movement substantially along optic axis 38. Objective lens 66 comprises means for projecting an image of object 60 onto a screen (not shown) positioned at an external focal plane of objective lens 66.

Figure 3:
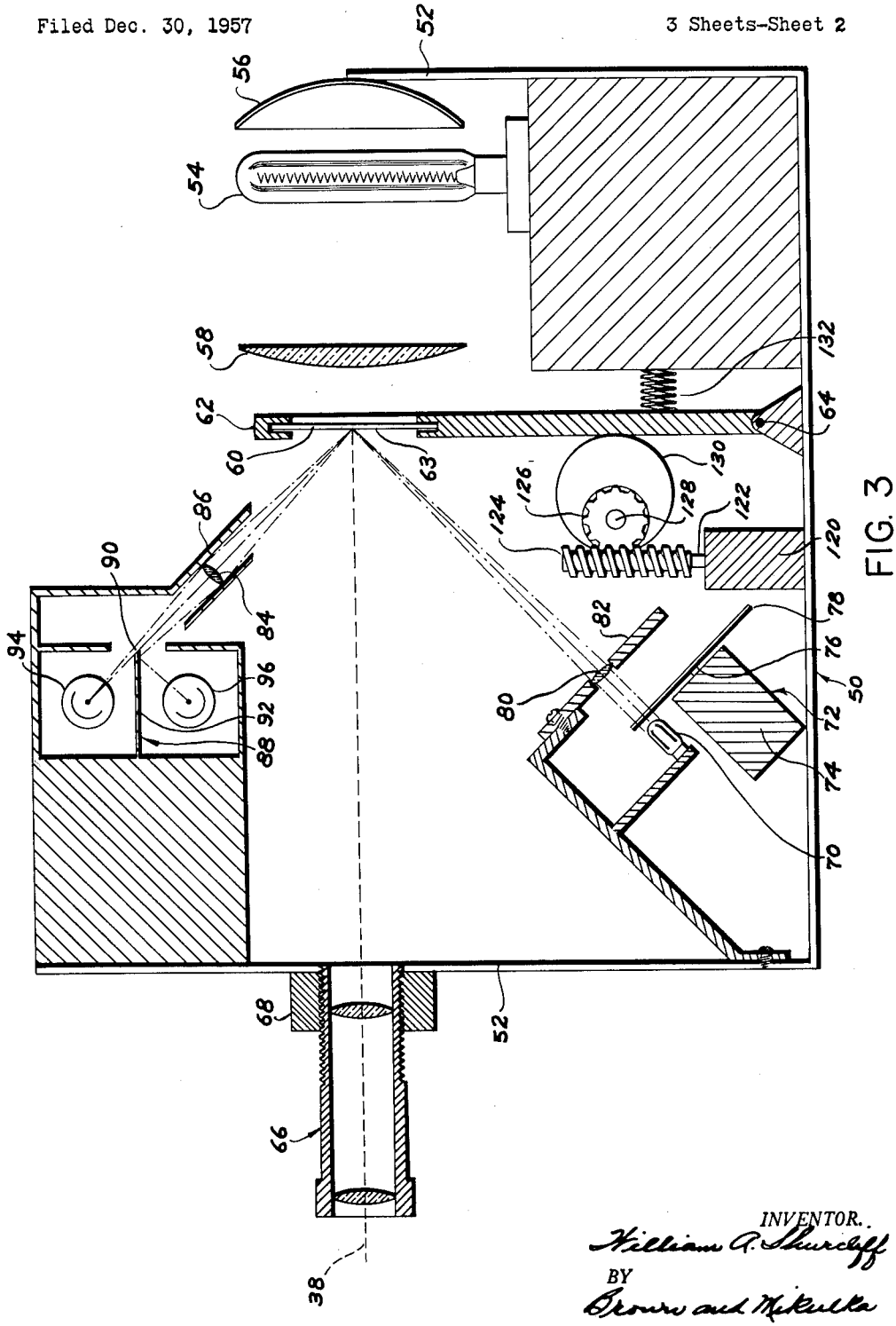
FIG. 3 is a diagrammatic elevational view showing an appraisal system and a focus adjustment system disposed in a projection device and forming one embodiment of the invention.

The appraisal system is enclosed by and mounted upon projector frame 52, as shown, and disposed between slide holder 62 and objective lens 66 to the side of axis 38. The appraisal system comprises a radiation reducing means such as incandescent bulb 70; it is understood that other radiation sources capable of radiating either within or without the visible spectrum may be employed, such as gaseous discharge tubes or ultraviolet or infrared radiators. In FIG. 3, the filament alone of bulb 70 comprises the radiation source. However, an aperture plate having an aperture therein may be introduced to limit the radiation source to the size of said aperture.

In order to prevent any confusion between the light and other radiation passing through the projector from the projector light source 54 and the light or radiation from the radiation producing means 70 of the appraisal system, the radiation used in the appraisal system may be coded to differentiate it from the main projection beam. Conversely, the main projection beam itself may be coded to achieve the desired differentiation. Coding may be accomplished in a variety of ways, for instance, by passing the beam of radiation through a chopper to impart a given frequency, by vibrating an aperture plate laterally, or by pulsing the electrical input to the radiation producing means itself. In the illustrated embodiment, as a means for coding a beam of radiation coming from bulb 70, there is provided, adjacent bulb 70, a chopper 72 having a motor 74, a shaft 76 attached thereto, and a rotatable disc 78 mounted upon said shaft, disc 78 having formed therein a plurality of openings (not shown) such that on rotation of disc 78 said openings alternately interrupt the beam of light coming from bulb 70, thereby modulating said beam of light. The illustrated embodiment may comprise, for instance, a disc having twenty-four peripheral radial slots, said disc rotating at thirty r.p.s., and therefore modulating said beam of light to impart a frequency of 720 cycles per second. Disposed in the mean path of a beam of light coming from bulb 70 and passing through the rotating slots in disc 78 is a first focusing means comprising a double convex lens 80, mounted in adjustable mounting means such as plate 82. Lens 80 is disposed for adjustment such that when film slide 60 and objective lens 66 are properly spaced to focus the projection subsystem, an image of the filament of bulb 70 is focused upon the surface 63 of film slide 60 by directing a beam of light along a first optical path to the point of intersection of optic axis 38 of objective lens 66 with the internal focal plane of said lens. In the preferred embodiment the optic axis of lens 80 intersects the planar surface of film slide 60 at an angle of substantially 45 degrees, the angle, however, being variable to adapt the system for inclusion within a projector of a given volumetric configuration or to introduce greater sensitivity to the appraisal process.

A second focusing means comprising double convex lens 84 is disposed such that the optic axis of the second focusing means 84 is colinear with the beam of light reflected from the surface of film slide 60 when said surface is coincident with the internal focal plane of objective lens 66 in a properly focused projection. It is preferred that lens 84 so have an angular subtense substantially greater than lens 80 that all of the reflected beam of light passes through lens 84. Second focusing means 84 is enclosed in a radiation shielding means comprising a hollow tube 86 of substantially the same internal diameter as lens 84 and having a radiation absorptive surface. Disposed on that side of lens 84 opposite film slide 60 and disposed in the optical path of the beam of light passing through lens 84 is beam splitting means 88 comprising, in the preferred embodiment, a knife-edged specularly reflecting plane surface. However, said beam splitting means may also comprise a biprismatic reflecting wedge, a prism, and opaque nonreflecting knife-edged surface, a double convex mirror or the like. The knife-edge 90 of beam splitting means 88 is disposed with knife-edge 90 tangent to the optic axis of lens 84, the plane of beam splitting means 88 being disposed obliquely to said optic axis such that the beam of light coming from lens 84 may be split into subsidiary beams, one of said beams passing said knife-edge, the other of said beams being reflected from the specular surface 92 of said beam splitting means. Alternatively, lens 84 may image the reflected beam onto a focal plane coincident with knife-edge 90 to increase the sensitivity of the appraisal system. Adjacent to said beam splitting means are means sensitive to light intensity or other radiation comprising two photoelectric cells 94 and 96 disposed such that light coming from said beam splitting means may be distributed to said cells. This distribution of light may be at a set ratio when the spatial relationship of film slide 60 and objective lens 66 is such that the projector is at its preset focus. The means responsive to radiation may comprise any of the photoelectric cells well known to the art, such as the cadmium or selenium cells in common use today.

When the projector goes out of focus due to movement of slide 60 along the optic axis of lens 66, the reflected beam is displaced laterally in proportion to the magnitude of the movement of slide 60. The distribution of light by said beam splitting means is then at a different ratio and photocells 94 and 96 receive disproportionate amounts of light. Hence, beam splitting means and photoelectric cells 94 and 96 altogether comprise means responsive to axial displacements of the reflected beam of light. Other means responsive to axial displacements of the reflected beam of light reflected from film slide 60 through second focusing means 84 may be provided. In lieu of beam splitting means 88 and photocells 94 and 96 there may be substituted a single photocell disposed substantially at the focal plane of lens 84 and being responsive to lateral motion of light across it such as the new semiconductive photocell disclosed in Proceedings of the I.R.E., 45, at page 474 of April 1957; or, in lieu thereof, there may be substituted a single photocell of the common selenium or cadmium variety situated substantially at the focal plane of lens 84, preceded with a black or otherwise radiation absorptive member for occluding a portion of the field of view of the single photocell, the electrical output of said photocell being bucked against a fixed bias voltage.

The entire focus subsystem is in a fixed spatial relationship to the objective lens mounting 68 and is movable, if at all, only therewith.

The focus correction subsection comprises such electronic and mechanical components as are shown by block diagram in FIG. 4, illustrating the mechanical connection to slide holder 62 and with electrical wiring being indicated by lines, which components operate together to establish focus of the projector by restoring the initial positional relationship of object and objective lens. Both sections preferably operate on null principles, thus being substantially independent of line voltage variations. The components shown by the block diagram are merely representative of components which could be used in this focus correction subsection. Other circuits and mechanisms identified with servo-mechanisms or regulator devices and differing in type and arrangement from those shown may be used to exploit the output of the light intensity responsive means for moving the slide holder 62. The mechanical linkage may also be modified to move the appraisal subsystem and objective lens mounting means of the projector as a single unit with respect to the object instead of moving the slide holder 62.

In the embodiment of the invention shown in FIG. 3 and FIG. 4, the focus correction subsystem is simple. As shown in FIG. 4, there are provided alternating current amplifiers 100 and 102, and rectifiers 104 and 106 for each photocell 92 and 94 respectively of the appraisal subsystem. In the event that the beam of radiation in the appraisal system is coded, the focus adjustment system is designed to discriminate the coded signals resultant from the appraisal system over any noise that might be present due to scattering of the primary beam of the projection system or extraneous light. Alternating current amplifiers 102 and 100 each amplifies the electrical output of its respective photocell and filters, said output to reject any current component other than the component having the frequency introduced into the system by the beam coding means such as chopper 72. Each of the signals is then rectified and fed to one of the coils of a two-coil polarized relay 108. Relay 108 comprises a control means for selectively introducing current from an external power source into a drive motor comprising phase coils 114 and 116 and rotor element 119. If the signals received from photocells 92 and 94 are in a predetermined ratio, relay 108 remains open. If, however, the ratio of said signals is not as predetermined, and photocell 92, for instance, sends the dominant signal, contact 110 will close sending a current in one direction through phase coil 114. If photocell 94 sends the dominant signal, contact 112 closes sending current in the other direction through phase coil 114. The closure of either contact 110 or contact 112 also introduces current into the fixed phase coil 116 through transformer 118, thus rotating rotor element 119 either clockwise or counterclockwise.

In FIG. 3, drive motor 120 comprises means for moving slide holder 62 substantially along axis 38 with respect to the objective lens 66. Attached to drive motor shaft 122 is worm gear 124 driving a circular toothed gear 126 mounted on shaft 128 which in turn is attached to projector frame 52. Drive motor 120 is preferably the type of motor which may be run in either direction, i.e., clockwise or counterclockwise. Attached eccentrically to shaft 128 is cam 130, said cam having a circular periphery or any other peripheral configuration that would present a continuous surface. Cam 130 is disposed such that it abuts slide holder 62, rotation of cam 130 pivoting slide holder 62 and associated film slide 60 substantially along the optic axis of objective lens 66. A resilient means such as spring 132 is provided to bias slide holder 62 against cam 130. Any imbalance of signals received from photocells 92 and 94 as filtered, amplified and rectified will result in the rotation of cam 130 to adjust the position of slide 60 in a direction and with a magnitude of movement equal and opposite to the original axial displacement of slide 60, thus returning the appraisal subsystem to a state in which the ratio of signals from photocells 92 and 94 return to its predetermined value and the motor ceases rotation. This arrangement for moving slide holder 62 minimizes "hunting" by providing means for virtually eliminating "backlash" inherent in rack-and-pinion or "parallelogram" linkages, a most necessary minimization inasmuch as "hunting" becomes very apparent and annoying when it results in continuous changes of focus in a projected image on a screen. However, this focus correction subsystem in combination with the appraisal subsystem never "rests" but is continually responsive to any signal received from the appraisal system and repeatedly corrects for slight "creeping" of object 60. Further, this correction subsystem always operates in the correct direction and stops correction when the focus error is reduced to zero, thus performing both functions qualitatively better than a human operator. It is understood that while the invention may employ the focus correction subsystem as described, other subsystems may be used, as for instance, a system in which a drive motor is continuously responsive to the total signal received, hence a proportional system as contrasted to the disclosed on-or-off electrical system.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. In an image-projecting device comprising an objective lens having a first focal plane and a second focal plane on opposite sides of said lens, means for mounting said lens, and means for carrying an object having a substantially planar surface, said projecting device being focused when said objective lens and said object are so disposed relative to one another that a projected image of said object is in substantial coincidence with said first focal plane and said plane surface is in substantial coincidence with said second focal plane, the combination with said projecting device of means for continuously appraising the focus of said device and means for automatically correcting changes in said focus, said continuous appraisal means comprising means for producing a beam of radiation, means for modulating said beam of radiation, means for focusing the modulated beam of radiation upon said planar surface such that said beam is reflected obliquely therefrom, whereby movements of said object along the optic axis of said objective lens produces proportional lateral displacements of the reflected beam, means for focusing said reflected beam, means responsive to said lateral displacements of said reflected beam, the last-named means being disposed substantially at a focal plane of the last-named focusing means and producing modulated electrical signals proportional to said lateral displacements of said reflected beam, said continuous appraisal means being substantially fixed relative to said lens mounting means, said automatic correcting means comprising a mechanism responsive only to said modulated electrical signals for moving said object for varying the spatial relationship between said object and said objective lens whereby said focus of said projecting device is maintained.

2. In a image-projecting device comprising an objective lens having a first focal plane and a second focal plane on opposite sides of said lens, means for mounting said lens, and means for carrying an object having a substantially planar surface, said projecting device being focused when said objective lens and said object are so disposed relative to one another that a projected image of said object is in substantial coincidence with said first focal plane and said planar surface is in substantial coincidence with said second focal plane, the combination with said projecting device of means for continuously appraising the focus of said device and means for automatically correcting changes in said focus, said continuous appraisal means comprising a light source disposed adjacent the optic axis of said objective lens and producing a beam of light, means for modulating said beam of light, a first focusing means adjacent one side of said optic axis for so directing said beam of light at an acute angle to said axis to a focus substantially at the point of intersection of said axis with said second focal plane of said objective lens that said beam is reflected from said planar surface, a second means for focusing the reflected beam disposed adjacent the opposite side of said axis and being in the mean optical path of said reflected beam, means disposed in the mean optical path of the focused reflected beam for splitting the last-named beam into two subsidiary beams, a pair of light detecting means disposed respectively in the paths of said subsidiary beams for producing electrical signals proportional to the intensities of said subsidiary beams, said continuous appraisal means being substantially fixed relative to said lens mounting means, said automatic correcting means comprising electronic means for filtering, amplifying and comparing said electrical signals and producing a corresponding electrical output, and means responsive to said electrical output for translating said output into mechanical motions of said object carrying means to maintain the focus of said projecting device.

3. In an image-projecting device comprising a first light source, an objective lens having a first focal plane and a second focal plane on opposite sides of said lens, means for mounting said lens, and means for carrying an object having a substantially planar surface, said projecting device being focused when said objective lens and said object are so disposed relative to one another that a projected image of said object is in substantial coincidence with said first focal plane and said plane surface is in substantial coincidence with said second focal plane, the combination with said projecting device of means for continuously appraising the focus of said device and means for automatically correcting changes in said focus, said continuous appraisal means comprising a second light source disposed between said objective lens and said object carrying means adjacent the optic axis of said objective lens and producing a beam of light, means for modulating said beam of light to impart characteristics to said beam for differentiating said beam from light coming from said first light source, said light beam being formed to have a slit-like cross section, a first focusing means adjacent one side of said optic axis for so directing said beam of light at an acute angle to said axis to a focus substantially at the point of intersection of said axis with said second focal plane of said objective lens that said beam is reflected from said planar surface, a second focusing means for focusing the reflected beam and having an angular subtense substantially greater than the subtense of said first focusing means, said second focusing means being disposed adjacent the opposite side of said axis and being in the mean optical path of said reflected beam, beam splitting means comprising a knife-edged element so disposed in the mean optical path of the focused reflected beam that said focused reflected beam is focused on the knife-edge of said element with the long axis of the cross section of said beam being parallel to said knife-edge, a pair of light detecting means disposed to intercept portions of said focused reflected beam which are reflected or passed by said beam splitting means, said light detecting means producing electrical signals in accordance with the reflecting or passing of said focused reflected beam, said automatic correcting means comprising electronic means for filtering, amplifying and comparing said electrical signals and producing an electrical output in accordance with the filtered, amplified and compared signals, and means responsive to said electrical output for translating said output into mechanical motions of said object carrying means to correct and maintain the focus of said projecting device.

References Cited in the file of this patent

UNITED STATES PATENTS

| | | |
|---|---|---|
| 1,866,581 | Simjian | July 12, 1932 |
| 2,011,932 | Ives | Aug. 20, 1935 |
| 2,134,757 | Goldsmith | Nov. 1, 1938 |
| 2,304,814 | Glasser | Dec. 15, 1942 |
| 2,517,246 | Seitz et al. | Aug. 1, 1950 |
| 2,747,456 | Waller et al. | May 29, 1956 |
| 2,947,215 | Mitchell | Aug. 2, 1960 |

FOREIGN PATENTS

| | | |
|---|---|---|
| 914,462 | Germany | July 1, 1954 |

OTHER REFERENCES

"Focusing a High Power Microscope," Baxter et al. article in the "Journal of the Optical Society of America," vol. 47, No. 1, January 1957, pages 76–80 cited.